Dec. 9, 1930.  E. C. SWANN  1,784,503

CEMENT GUN NOZZLE

Filed Sept. 6, 1928

Inventor:
Edward C. Swann
by: Charles W. Hills Attys.

Patented Dec. 9, 1930

1,784,503

UNITED STATES PATENT OFFICE

EDWARD C. SWANN, OF NEW YORK, N. Y., ASSIGNOR TO CEMENT GUN CONSTRUCTION CO., OF CHICAGO, ILLINOIS, A CORPORATION OF ILLINOIS

CEMENT-GUN NOZZLE

Application filed September 6, 1928. Serial No. 304,236.

This invention relates to nozzles and, particularly, rifled liners in mixing nozzles.

The nozzle about to be described is especially adapted for use with so-called "cement guns" in which sand and cement are mixed together, and with water at the time the mixture is projected from the nozzle into the atmosphere and against a surface being treated by the same.

Cement guns have been in extensive use for several years, but without as yet, having attained as high a degree of proficiency as is desired for economical operation. Among the difficulties experienced in the use of such guns may be mentioned "dusting" and "rebound".

"Dusting" is the term applied to the dust which is caused by the projection from the nozzle of a cement gun of unhydrated cement and fine dry sand.

"Rebound" is the term applied to the material which falls away from the surface of impact, i. e., the surface being treated by the gun. This has amounted to a very large proportion of the material projected from a nozzle, 30% being not unusual and often running as high as 50%.

"Rebound" is caused by particles of sand and gravel bouncing off the surface, and largely by the falling away of sand and gravel which is not sufficiently enveloped in plastic material to cause it to adhere to the surface against which it is projected.

Examination of "rebound" discloses the presence of a large amount of fine material as will hereinafter more fully be shown.

Inventors have striven for many years to find ways and means of securing more perfect hydration, as it is well recognized that "dusting" and "rebound" are functions of hydration.

Certain recently patented structures, such as that of Schaefer Patent No. 1,562,194 and Hamm Reissue Patent No. 16,539 have improved hydration to some extent, but without complete success.

It has been observed that the mixed hydrated materials tend to segregate after leaving the water rings as used in the nozzles of the above mentioned patents, the heavier sand and pebbles tending to hug the bottom of the nozzle, while the finer cement moves along the top so that the stream of so-called "gunite" issuing from a cement gun nozzle shows dark streaks at the bottom of the stream indicating incomplete mixture and, consequently, incomplete hydration.

My invention secures a much better hydration and thus a better mixture. I provide a pure gum rubber liner for the discharge portion of a nozzle such, for instance, as that described in Schaefer Patent No. 1,562,194 and rifle the liner by providing a plurality of ribs equally spaced about the inner surface of the liner. I have found that in practice three such ribs spaced 120° apart and all making turns of substantially 90° in the lengths of the ribs work very satisfactorily. These ribs so arranged do not form abrupt interference to the stream, but apply a gradual, axially rotative movement thereto, causing that portion of the stream coming in contact with such ribs to change its direction so that the heavier particles of sand and gravel flowing along the bottom of the nozzle are hurled upwardly, and that part of the stream of lighter cement and finer sand is hurled downwardly thus securing a more intimate mixture with great improvement in hydration, as the damp sand particles mingle to a greater extent with the cement particles than in any other nozzle, thereby wetting a much greater number of the cement particles than is possible with any other kind of liner.

An object of the invention is to provide a rubber rifled liner for cement gun nozzles.

Another object is to provide a rubber rifled liner for cement gun nozzles which will intimately mix the materials projected by the same.

A further object of the invention is to provide a rifled liner having a plurality of spiral ribs making turns of substantially 90° in the lengths of the ribs.

A further object is to provide a liner with a plurality of spiral ribs for accomplishing complete hydration of the cement.

A further object is to provide a rubber rifled liner for cement guns having a plurality of ribs making 90° turns by which all the cement particles are hydrated and completely mixed with other materials.

A further object is to provide a rifled liner which in combination with the alternately expanding and contracting nozzle as described in Schaefer Patent No. 1,562,194, will more intimately mix the materials projected by the same.

A still further object of the invention is to provide a rubber rifled liner for cement gun nozzles which is economical to manufacture and highly efficient in use.

The above, other and further objects of the invention will be apparent from the following description, accompanying drawings and appended claims.

According to the invention, a rubber liner of pure gum is formed with spiral ribs on the interior thereof, which ribs make turns of approximately 90° in the lengths of the same which are so arranged as to hurl upwardly the heavier sand and gravel which ordinarily gravitates to the bottom of the nozzle.

The liner of this invention may readily be used with a cement gun nozzle such as that disclosed in U. S. Letters Patent No. 1,562,194, granted November 17, 1925, to John V. Schaefer, or it may be used with a simpler nozzle having only one discharge part.

One form of the invention is illustrated in the accompanying drawings and the views thereof are as follows.

Figure 1:
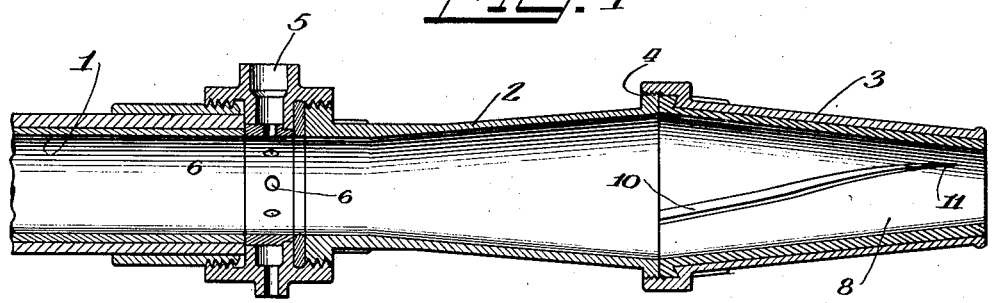
Figure 1 is a vertical axial section through a nozzle, a fragmental portion of hose, and a liner embodying my invention applied in the nozzle.
Figure 2:
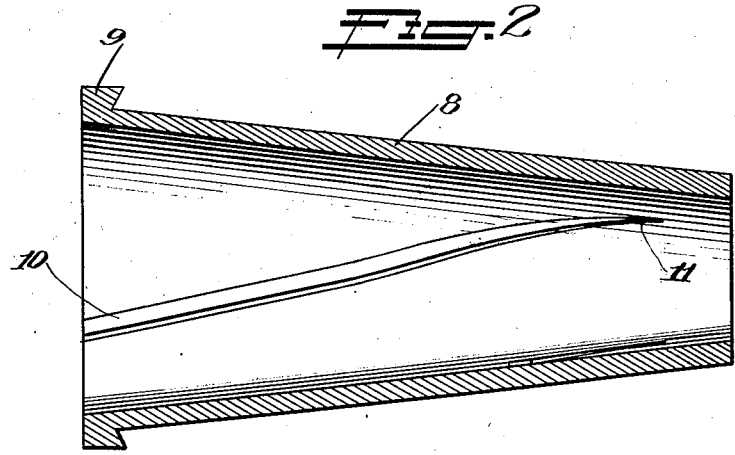
Figure 2 is an enlarged section of the liner taken on line II—II of Figure 3.
Figure 3:
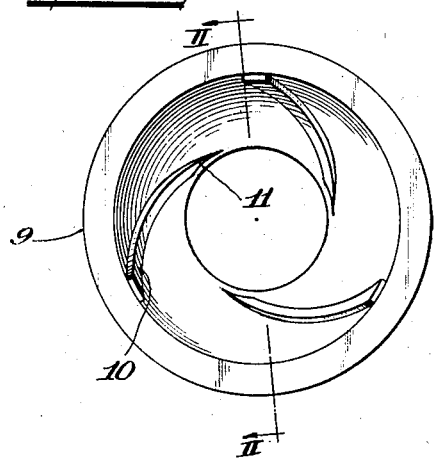
Figure 3 is an end elevation of the liner looking at the left hand end of Figure 2.
Figure 4:
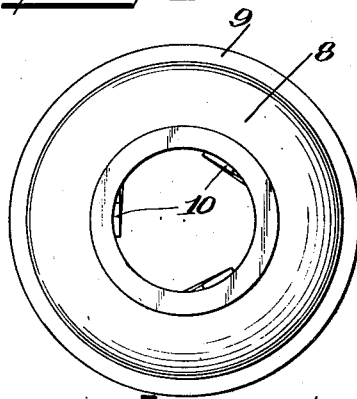
Figure 4 is an end elevation of the liner looking at the right hand end of Figure 2.

There are shown in the drawings a portion of a hose 1 through which the cement, air, sand and/or gravel is forced to the nozzle, which in the present illustration consists of the water ring 7 and a nozzle tip comprising two portions 2 and 3 secured together by the threaded connections at 4. The portion 2 is divergent in the direction of flow of the material, while the portion 3 is convergent.

The mixture of sand, cement, gravel, and the like, is supplied to the hose 1 in any suitable manner and water is delivered to the water ring 7 through lateral openings 5 connected with a suitable source of supply being projected in jets passing through radial openings 6 in the water ring 7 against the stream of dry material.

The liner of my invention is made of pure gum rubber and is shaped to conform to the portion 3 of the nozzle, that is the discharge end of the nozzle structure.

The body 8 of the liner which is conical lengthwise and circular in cross section, is provided with a radial flange 9 for cooperating with the coupling 4 between the portions 2 and 3 of the nozzle structure for securing the liner in position.

Spiral ribs 10 are formed integrally with the body 8 of the liner and extend from near the larger or entrance end of the liner toward the discharge or smaller end of the liner and preferably terminate short of the discharge end of the liner as at 11. The ribs 10 in their length make turns of substantially 90°.

I prefer to employ three such ribs spaced circularly 120° all of which make turns of substantially 90° so that the total curvature of the three ribs is less than 360° or less than one complete turn of a spiral.

The mixture of cement, sand and/or gravel and air is forced through the hose 1 and into the nozzle, being wet through the jet openings 6 in the water ring 7. The elements of this moving stream of material separate by gravity, the heavier elements hugging the bottom of the nozzle and the lighter elements, such as air and cement, traveling along near the top of the nozzle. This material reaches the liner 8 with its three spiral ribs or rifling and is acted on by these ribs in a manner to raise the heavier material and hurl it upwardly into the stream of cement and air, while the cement and air will be hurled downwardly into the stream of coarser or heavier materials, thus securing intimate mixture of the ingredients and completely hydrating all of the cement particles by directing same against the damp sand and/or gravel. The stream issuing from the liner will, therefore, be completely mixed, without any streaks of unmixed material appearing in the same.

A nozzle equipped with my rifled liner operates with practically no "dusting". "Rebound" from my rifled liner is much less than from other types of liners, such rebound contains no cement showing clearly that all of the cement projected through a nozzle equipped with my rifled liner is hydrated and sticks to the surface against which it is projected.

A recent large contract has been completed in which part of the materials were projected by a nozzle equipped with my rifled liner and part projected by a nozzle equipped with a smooth liner. The apparatus and operation in each instance were the same. Also the sand, gravel and cement used were the same.

The "rebound" from the smooth liner consisted of 365 cubic feet, while the rebound from the rifled liner of my invention consisted of 243 cubic feet, or a saving of 33%. The same area was covered in each instance. Tests were made of the two "rebounds" just mentioned and were as follows:

| Size mesh used in screen test | Per cent of entire sample which did not go through mesh of screen | |
|---|---|---|
| | Rifled liner | Plain liner |
| 4 | 6 | 0 |
| 8 | 20.1 | 1.6 |
| 10 | 6.7 | 3 |
| 20 | 23.1 | 21 |
| 30 | 20.1 | 24.4 |
| 50 | 12 | 29 |
| 100 | 12 | |
| 200 | 0 | 18 |
| Pan | 0 | 3 |
| | 100 | 100 |

The test shows that of the rebound from the rifled liner nothing was finer than 100 mesh and only 12% went through a 50 mesh, while of the rebound from the plain liner 21% went through 50 mesh and 3% went through 200 mesh, thus showing clearly, more perfect hydration of the fines with the rifled liner.

While I have described more or less precisely the details of construction of my invention, yet I do not wish to be understood as limiting myself thereto, as I am aware that changes may be made in the arrangement and proportion of parts, and that equivalents may be substituted all without departing from the spirit and scope of my invention.

I claim as my invention:

1. A rubber liner for a cement gun nozzle having a plurality of circularly spaced ribs on the inner surface of the liner.

2. A rubber liner for a cement gun nozzle having a plurality of circularly spaced ribs on the inner surface of the liner, all of said ribs making approximately 90° turns in the lengths of the same.

3. A rubber liner for a cement gun nozzle having a plurality of spiral ribs formed on the inner surface of said liner and circularly spaced, said ribs terminating short of the discharge end of said liner.

4. A rubber liner for a cement gun nozzle having a spiral rib therein for hurling sand upwardly within said liner and another spiral rib for hurling cement downwardly within said liner.

5. A rubber liner for a cement gun nozzle having a plurality of spiral ribs on the inner surface of said liner, one of said ribs being positioned for engagement by coarse material within said nozzle and another rib positioned for engagement by fine material being projected through said liner for deflecting said materials out of the normal paths of travel of the same and each into the deflected path of travel of the other.

6. A rubber liner for a cement gun nozzle having a spiral rib therein making a turn part way around the inner surface of said liner.

7. A rubber liner for a cement gun nozzle having three spiral ribs therein, said ribs being spaced equidistantly circularly and all making turns of substantially 90°, and all terminating short of the discharge end of said liner.

8. A rubber rifled liner for cement gun nozzles having a plurality of spiral ribs forming the rifling.

9. A rubber rifled liner for cement gun nozzles having a plurality of spiral ribs forming the rifling and all of said ribs making turns of approximately 90°.

10. A rubber liner for a cement gun nozzle having spiral ribs therein extending from the inlet end of said liner towards and terminating short of the outlet end thereof and making turns of substantially 90° in such length.

11. A cement gun nozzle comprising in combination a portion diverging in the direction of flow, and another converging in the direction of flow, and a rubber liner in said last named portion having a plurality of spiral ribs on the inner surface of said liner.

12. A cement gun nozzle comprising in combination a portion diverging in the direction of flow, and another converging in the direction of flow, and a rubber liner in said last named portion having a plurality of spiral ribs on the inner surface of said liner, and all of said ribs making turns of approximately 90° in the lengths of the same.

13. A cement gun nozzle comprising in combination a portion diverging in the direction of flow, and another converging in the direction of flow, and a rubber liner in said last named portion having a plurality of spiral ribs on the inner surface of said liner.

14. A cement gun nozzle comprising in combination a portion diverging in the direction of flow, and another converging in the direction of flow, and a rubber liner in said last named portion having a plurality of spiral ribs on the inner surface of said liner, and all of said ribs making turns of approximately 90° in the lengths of the same, said ribs being equidistantly circularly spaced.

15. A cement gun nozzle comprising in combination a water ring, a nozzle tip attached to said ring, said tip comprising an intermediate diverging portion and a convergent end portion, a rifled rubber liner in said convergent end portion, the rifling in said liner including a plurality of spiral ribs circularly spaced and all making turns of approximately 90° in the length of the same, said ribs terminating a short distance inwardly of the discharge end of said liner.

In testimony whereof I have hereunto subscribed my name at New York, county, New York.

EDWARD C. SWANN.